United States Patent [19]

Talanda

[11] 4,358,091
[45] Nov. 9, 1982

[54] DEVICE FOR THE REMOVAL OF WASTE PRODUCTS CREATED DURING THE THERMAL SEPARATION OF MATERIAL

[75] Inventor: Milan Talanda, Libina, Czechoslovakia

[73] Assignee: Vitkovice, Unicovske strojirny, koncernovy podnik, Unicov, Czechoslovakia

[21] Appl. No.: 279,060

[22] Filed: Jun. 30, 1981

[30] Foreign Application Priority Data

Jun. 30, 1980 [CS] Czechoslovakia .................... 4636-80

[51] Int. Cl.³ .............................................. B23K 7/08
[52] U.S. Cl. ........................................................ 266/49
[58] Field of Search .......................................... 266/49

[56] References Cited

U.S. PATENT DOCUMENTS

3,851,864 12/1974 Miller .................................... 266/49
4,168,055 9/1979 Roeder et al. ......................... 266/49

FOREIGN PATENT DOCUMENTS

2536429 9/1976 Fed. Rep. of Germany ........ 266/49

Primary Examiner—W. Stallard

[57] ABSTRACT

A device for the removal of waste products created during the thermal separation of materials by use of a foam. The device consists of a reservoir having a working grate in its upper portion to hold the material to be cut and an inlet and outlet in the lower portion of the reservoir. Means for feeding foam into the reservoir are connected to the inlet. The outlet is connected to a terminal which has an opening permitting foam to flow from the reservoir and form a protective mantle.

9 Claims, 1 Drawing Figure

U.S. Patent      Nov. 9, 1982      4,358,091
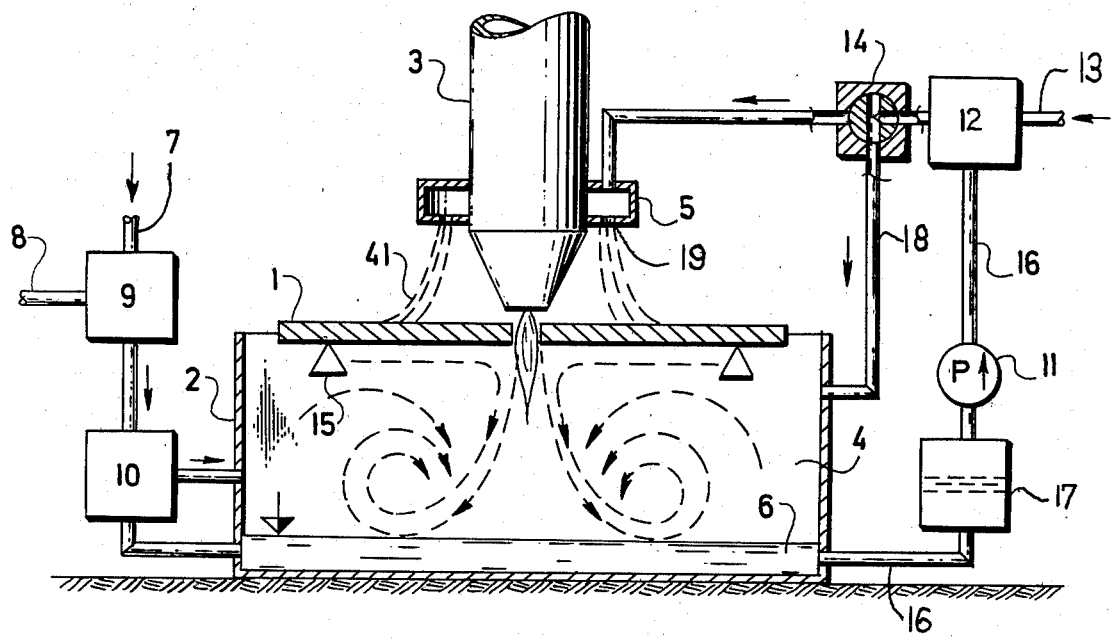

DEVICE FOR THE REMOVAL OF WASTE PRODUCTS CREATED DURING THE THERMAL SEPARATION OF MATERIAL

BACKGROUND OF THE INVENTION

The present invention relates to a device for the removal of waste products or residues created during the thermal separation of material, when a device such as a plasma torch is used, by means of a foam.

Elimination of waste products during the thermal separation of material is presently carried out by several methods. The waste products are removed either by suction or by use of a water working table. When a water working table is used, water is kept in a reservoir which reaches either below or over the level of the material to be separated. When a plasma torch is used to cut the material, it is also provided with an annular jet of water around the torch, which forms a protective mantle.

The disadvantages of the removal of waste products by suction are that a suction device causes a substantial increase in the decibel level in its vicinity, which is deleterious to the operator of the device. In addition, substantial losses of heat occur near the torch, due to the removal of the surrounding atmosphere by the suction device.

Furthermore, when a suction device is used with a plasma torch, a special filtering unit is often needed to remove certain gases, such as nitrous gases, from the atmosphere removed by the suction device as their level has increased. Thus, the cost for a suction unit, with the special filtering unit, can often exceed the cost of the plasma torch.

The drawback of using water working tables for the removal of waste products occurs when the water does not reach over the material to be cut. If the torch is not kept under the water level or the annular jet of water, forming a mantle around the torch, is not used, harmful waste products pass around the torch to the atmosphere. However, when the torch is kept under the water level or if the annular jet of water is used, it is difficult to control the torch height above the material to be cut and difficult to control the thermal process, thus decreasing the cutting efficiency. Another drawback is that the water, when it removes the residues, contains substantial amounts of impurities and thus cannot be disposed of by discharge into the sewage system.

Another known method of removing residues, when a plasma torch is used, involves surrounding the plasma flow with a layer made of either a powdered material or a foam or a liquid. Spraying of this layer takes place during the burning process, in the area around the cutting zone and below the material to be cut. The drawback of this process, when a powdered material is used, is that harmful gases, such as phosgenes and hydrogen fluorides, are formed, during the decomposition of the powdered material. When only foam or liquid is used, while removal of the residues is solved, the problem connected with water working tables arises, namely disposal of the saturated material.

SUMMARY OF THE INVENTION

The above-mentioned drawbacks are eliminated by the present invention which uses a foam to remove the residues.

The invention has a reservoir with a working grate located in its upper portion on which the material to be cut by the torch is placed. The reservoir is connected to a level switch, which is connected to an inlet mixer in which the foam is created. The lower portion of the reservoir has an outlet for the discharge of liquid contaminated by the residues. The outlet is connected to a pump which is connected to a valve. The valve is connected to a terminal which permits the formation of a foam mantle at the torch. The valve is also connected with the upper portion of the reservoir.

A foamer can be placed between the pump and the valve with the foamer having an inlet permitting the addition of additional gas if need be. Also, a filter can be connected between the reservoir outlet and the pump.

The advantages of the invention are that perfect automatic mixing and formation of the foam and its supply into the area where the residues are created is insured. Thus, removal of the residues is insured, as the residues are absorbed into the surface of the foam membranes and the foam carries the residues into the reservoir. As a dry process is in use, no hardening of the cut edges take place. Also, the problem of handling wet residues after burning is eliminated and the problem of disposal of the polluted liquid is eliminated as well as no concentration of harmful products takes place.

The disadvantages of the use of a suction device, such as noise, are also not present. Furthermore, the invention does not requite the raising of the atmospheric temperature at the torch, which is done when suction devices are used due to their lowering the temperatures. In addition, the cost for building the present invention as well as its operating costs are substantially lower than suction devices.

BRIEF DESCRIPTION OF THE DRAWING

Further features and advantages of the invention become clear from the following description and drawing.

The single FIGURE is a schematic view showing the invention.

PREFERRED EMBODIMENT

As shown in the drawing, the device consists of a reservoir 2 for foam 4. In the upper portion of the reservoir 2, a working grate 15 is located, on which the material 1 to be separated is placed. The working grate 15 is either fixed or has an auxiliary bottom to permit dumping. The reservoir 2 has attached to its lower portion a means of feeding foam 4, which consists of an inlet mixer 9 connected to a level switch 10 with the level switch 10 connected to reservoir 2. The inlet mixer 9 has a first inlet 7, through which a liquid, such as water is fed, and a second inlet 8, through which the foaming agent is fed.

The lower portion of the reservoir 2 has an outlet 16 for the discharge of contaminated liquid 6. Outlet 16 is connected to a filter 17 which is connected to a pump 11. The pump 11 is connected to a foamer 12, which can be a mechanical or pneumatic mixer, which has an inlet 13 for feeding any additional gas, such as air, hydrogen, carbon dioxide, or argon, as needed.

The foamer 12 is then attached to valve 14 which is connected to a terminal 5 at the torch 3 for the formation of a foaming mantle 41. The terminal 5 has a jet 19 with at least one hole, which has an annular form.

Valve 14 is also connected with the upper portion of reservoir 2 by means of pipe 18. The valve 14 in this embodiment is a three-way cock.

The material 1 to be cut is placed on the working grate 15 below the torch 3. A liquid, such as water, is fed into the first inlet 7 of the inlet mixer 9 and a surface active compound, such as an alkali metal, is fed into the second inlet 8 in order to form a foam. The surface active compound comprises from 1 to 3% of the foam solution. The foam 4 is then fed into the reservoir 2.

Due to the hydrostatic pressure of foam 4, a portion of it becomes liquified. The liquid 6 is pumped through the filter 11 and the foamer 12 to the terminal 5. Due to the foamer 12 and the expansion of the compressed liquid it descends through jet 19 as a foamy mantle 41.

The foamy mantle 41 absorbs the waste products created by the cutting action of the torch 3 and either passes down into the reservoir 2 or is evaporated due to the heat of the torch 3. When the foam 4 reenters the reservoir it falls to the bottom of the reservoir 2, where due to its contamination and the hydrostatic pressure of the foam 4, it becomes part of the liquid 6, which is then pumped through the filter to repeat the process again.

When a portion of the foam evaporates, due to the heat of the torch 3, the waste products absorbed remain as microsediments on the surface of the separated material 1, which microsediments have no effect on any further process.

As the foam 4 evaporates, the reservoir 2 automatically fills up with foam 4 to compensate for the loss, due to the level switch 10, sensing the level in the reservoir 2.

Although the invention is illustrated and described with reference to a plurality of preferred embodiments thereof, it is to be expressly understood that it is in no way limited to the disclosure of such a plurality of embodiments, but is capable of numerous modifications within the scope of the appended claims.

I claim:

1. A device for the removal of waste products created during the thermal separation of material comprising a reservoir having a working grate in its upper portion to hold the material to be separated, an inlet in the lower portion of the reservoir connected to a means for supplying foam, an outlet in the lower portion of the reservoir which is connected to a terminal having an opening which attaches to a cutting torch, whereby foam flows from the reservoir to the terminal and forms a protective mantle around the torch.

2. A device as claimed in claim 1, wherein the outlet of the reservoir is connected to a pump which is connected to the terminal.

3. A device as claimed in claim 2, wherein the outlet of the reservoir is connected to a filter and the filter is connected to the pump.

4. A device as claimed in claim 2 or 3, wherein the pump is connected to a valve and the valve is connected to the terminal.

5. A device as claimed in claim 4, wherein the valve is also connected by means of a pipe with the upper portion of the reservoir.

6. A device as claimed in claim 5, wherein the pump outlet is connected to a foamer which is connected to the valve.

7. A device as claimed in claim 6, wherein the foamer has an inlet, whereby additional gas can be fed through the inlet into the foamer.

8. A device as claimed in claims 1,2, or 3, wherein the means for supplying foam to the reservoir comprises a level switch connected to the inlet of the reservoir and an inlet mixer is connected to the level switch.

9. A device as claimed in claim 8, wherein the inlet mixer has two openings, whereby a liquid is fed into one opening and a surface active compound is fed into the second opening creating the foam.

* * * * *